United States Patent [19]

Fjeldsa

[11] 4,283,880

[45] Aug. 18, 1981

[54] PEAT PAPER AND A METHOD FOR ITS MANUFACTURE

[76] Inventor: Öyvind Fjeldså, Nedergårdsgatan 16, Lilla Edet, Sweden, 463 00

[21] Appl. No.: 87,473

[22] Filed: Oct. 23, 1979

[30] Foreign Application Priority Data

Oct. 31, 1978 [SE] Sweden .............................. 7811265

[51] Int. Cl.³ .......................................... A01G 31/00
[52] U.S. Cl. ............................................ 47/56; 47/9
[58] Field of Search .................................. 47/56, 9, 58

[56] References Cited

U.S. PATENT DOCUMENTS

| | | | |
|---|---|---|---|
| 2,826,865 | 3/1958 | Chohamin | 47/56 |
| 2,876,588 | 3/1959 | Tietz et al. | 47/56 X |
| 2,909,003 | 10/1959 | Marshall | 47/56 |
| 3,914,901 | 10/1975 | Muldner | 47/56 |
| 4,066,490 | 1/1978 | Yoshimi | 47/56 X |
| 4,173,844 | 11/1979 | Knolle et al. | 47/56 |
| 4,190,981 | 3/1980 | Muldner | 47/56 |

*Primary Examiner*—Robert E. Bagwill
*Attorney, Agent, or Firm*—Allan R. Plumley

[57] ABSTRACT

A peat paper used to improve the quality of the soil in connection with planting, sowing or weed-control. The paper consists of peat fibres (4), cellulose fibres (1), and a bonding agent. The disclosure also teaches the method of producing said peat paper. The peat paper is characterized in that in a lower layer the cellulose fibres (1) support the peat fibres (4) and in that the cellulose fibres and peat fibres (1,4) are bonded together by means of the bonding agent in a dry-formation process so as to form paper-like sheets or webs. The resulting peat paper is soft and owing to its method of production controlled amounts and/or layers of additives, such as fertilizers, seeds, hormones, and similar additives may be incorporated into the paper.

3 Claims, 4 Drawing Figures

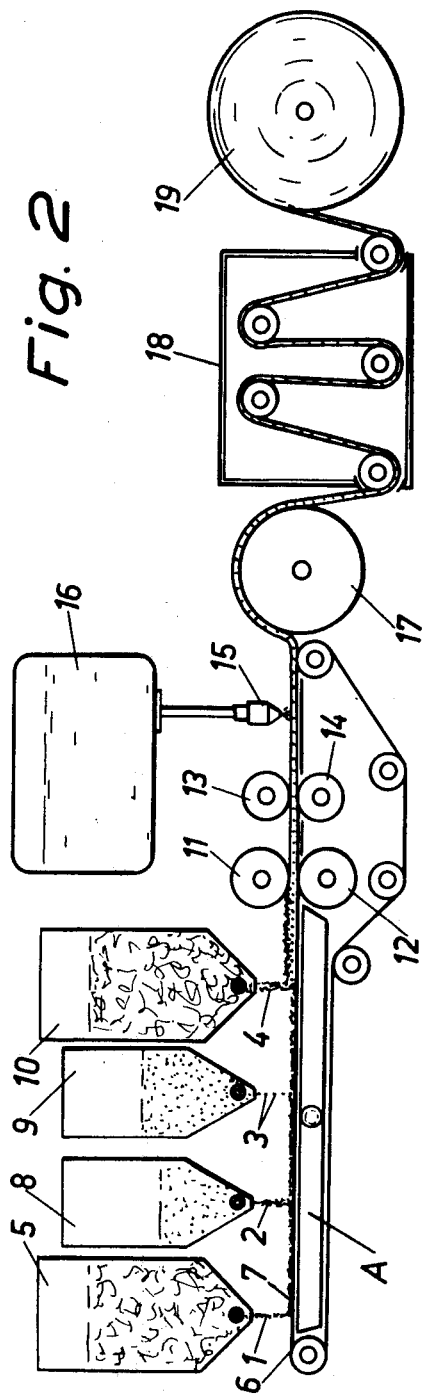
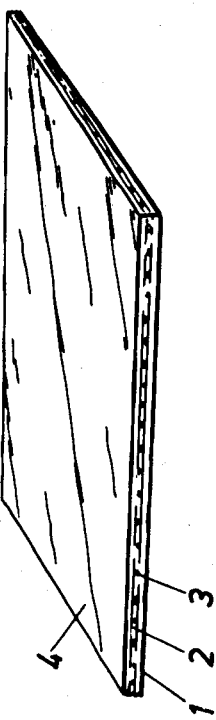
Fig. 1
Fig. 2

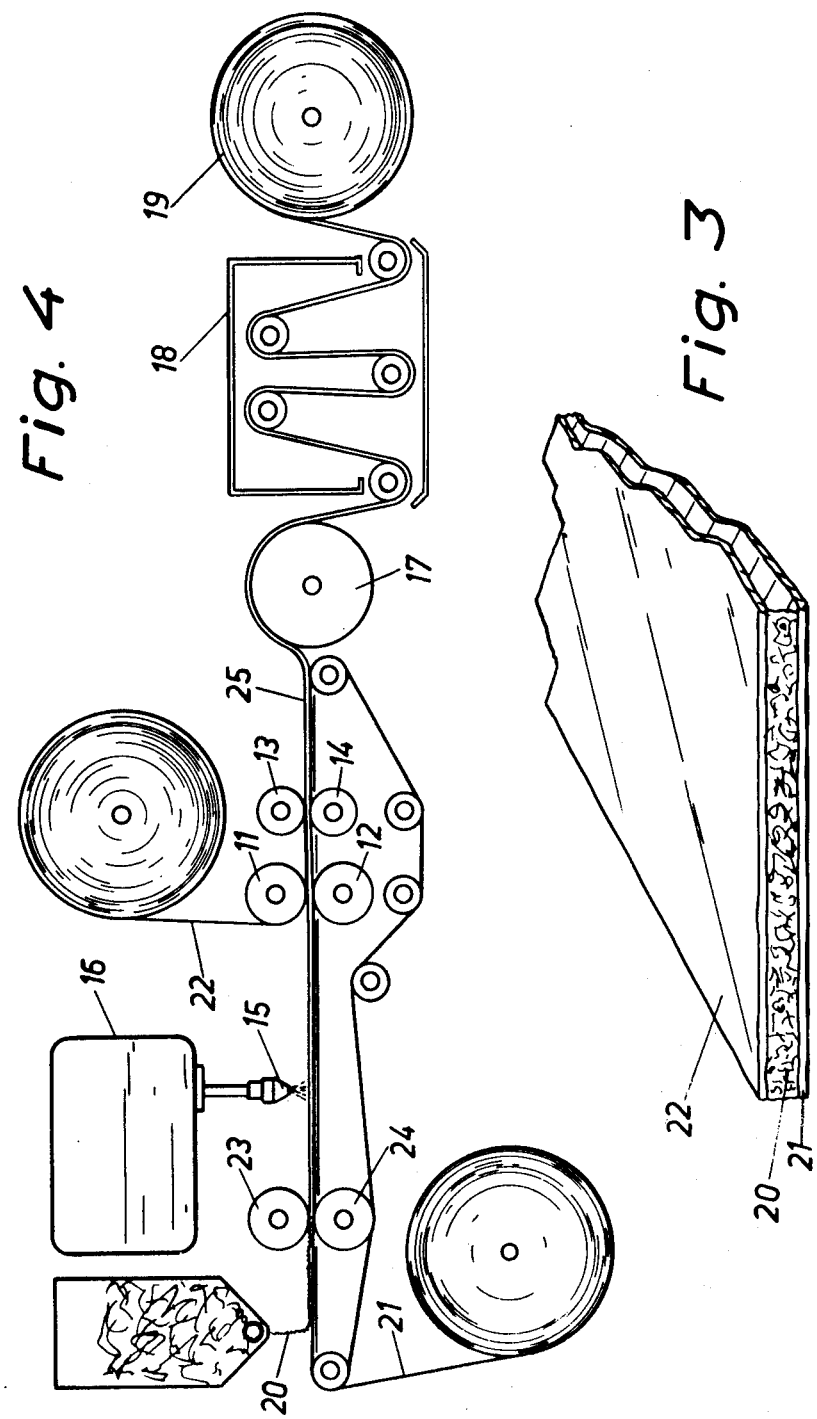

PEAT PAPER AND A METHOD FOR ITS MANUFACTURE

BACKGROUND OF THE INVENTION

The subject invention concerns peat paper of the kind which serves to improve the quality of the soil in connection with planting, sowing or weed-control and which consists of peat fibres, cellulose fibres and a bonding agent.

The use of peat as a soil-improving material is well-known. Peat products produced according to the dry process, e.g. by compression, are also well known. The manageability of these products, which usually are in the form of briquettes, is poor. The production costs of such products are high and the use of these products for the purpose of e.g. sowing grass-seeds for lawns or to improve the soil quality over large areas is not realistic.

Peat paper with or without admixture thereinto of seeds is also well known. Peat paper of this kind has hitherto been produced by collecting peat fibres suspended in a water slurry in a fibre wet press. Peat paper produced in accordance with this method—the wet process—possesses good moisture-retaining qualities and has proved very valuable for planting purposes. A drawback inherent in this kind of product is, however, that the method of producing the paper does not advantageously lend itself to admixture into the paper of additives, such as substances increasing the liquid-absorption capabilities of the paper, fertilizing agents or seeds in exact doses and in even layers. In addition, peat paper produced in accordance with this "wet process" becomes hard and brittle as a result of the chemical bonds that form between the cellulose fibres.

Peat paper incorporating the additives mentioned in the afore-going could find considerably more extensive and varied applicability, for if it were possible to include therein chemical additives, such as hormones and the like, the resulting paper product could be adapted to the needs of a great variety of tasks and usages. For instance, a layer of highly absorbent material incorporated in the paper would serve as a water reservoir and increase the usefulness of the paper in all arid regions, such as deserts.

SUMMARY OF THE INVENTION

The subject invention is characterised in that in a lower layer of the peat paper in accordance with the teachings herein the cellulose fibres support the peat fibres and in that the latter fibres are bonded to the cellulose fibres by means of the bonding agent in the process of the forming of the fibres into a paper-like sheet or web in accordance with the "dry method". This production method lends itself to controlled admixture into the paper of additives, such as liquid-abosrbent substances, seeds, chemicals and other similar substances and additives in exact doses and in even and well-defined layers.

In accordance with the teachings of the invention is provided a peat paper which lends itself to a variety of applications and thus may find extensive usage and in addition is simple to manufacture.

BRIEF DESCRIPTION OF THE DRAWINGS

The invention will be described in closer detail in the following with reference to two embodiments thereof illustrated in the accompanying drawings, wherein FIG. 1 shows a sheet of peat paper in accordance with a first embodiment of the invention, FIG. 2 is a lateral view of an apparatus showing the principle of manufacture of the peat paper in accordance with said first embodiment, FIG. 3 illustrates a sheet of peat paper produced in accordance with a second embodiment of the invention, and FIG. 4 shows in a lateral view an apparatus illustrating the principle of manufacture of the peat paper in accordance with said second embodiment.

DETAILED DESCRIPTION OF TWO PREFERRED EMBODIMENTS

The manufacture of the peat paper takes place in the following manner. A highly absorbent material, such as e.g. cellulose, is shredded and, by being blown in a stream of air from a container 5, it is deposited on an endless belt, e.g. a wire (as used in a paper making machine), which is indicated as a whole by numeral 6. In the procedure the air is sucked through the wire into a suction box A whereas the cellulose fibres are retained on the wire 6 in a layer 1. To the material web 7, formed by the absorbent material, are added fertilizers in the form of a powder from a container 8, seeds 3 are added from a container 9 and peat, finely disintegrated is added in a stream of air from a container 10.

The material web 7 is compressed when passed through the press nip formed by two rollers 11, 12 and is thereafter embossed when passed between two embossing rollers 13, 14, whereafter a bonding agent is sprayed over the web with the aid of a sprayer means 15, the bonding agent being supplied from a container 16.

The material web is dried in a first stage comprising a rotating drum 17 over which the web is allowed to travel, whereafter it is carried into a drying chamber, generally designated by numeral 18, wherein the final drying of the web takes place. Finally, the material web is wound into a roll 19.

The cellulose layer serves as a filtering layer to the air-borne peat fibres or particles, preventing the latter from passing through the wire. Tissue-paper and similar materials could be used for the same purpose. The layers 1 to 4 (FIG. 4) are bonded together with the aid of a bonding agent. The advantage of this procedure is that the resulting web is soft and pliable.

The peat paper produced in accordance with the second embodiment consists of one layer of peat 20 on either side of which are applied sheets 21, 22 consisting of a water-permeable material or being in the form of a fibrous web, such as e.g. tissue-paper or equivalent materials.

FIG. 4 illustrates in a schematic form the method of producing the peat paper shown in FIG. 3. This paper can be produced on the same production machinery as the one described with reference to embodiment 1, with minor modifications. The production takes place in the following manner.

Peat in a finely disintegrated form is deposited on a material web 21 consisting e.g. of a tissue-paper or an equivalent material. In this stage of the production, fertilizers, seeds and/or other substances could be added to the material web 21. The material web with the peat thereon—and the additives, if any—is compressed when passed through the press-nip formed by two rollers 23, 24 whereupon a bonding agent is sprayed over the web by means of a sprayer 15. A second, upper layer consisting of a water permeable material, such as a tissue-paper-type of material, is thereafter appplied in the form of a web 22.

From this point onwards, the procedure of manufacture is identical with the one described with reference to embodiment one, comprising compressing the material web 25, followed by embossing, drying and finally winding the web into a roll 19.

The advantage of forming peat paper in accordance with the "dry method" is that the resulting product possesses improved manageability and that the production capacity is higher. The delicate control of the admixture of additives that is possible when the dry-formation method is used makes it possible to obtain a very even distribution of the various components of the product. This kind of consistency of quality is not obtainable with any other automated production method. Dry-formation machines are available to-day that are capable of working satisfactorily with web widths up to 5 meters. The production capacity of these machines is as high as 400 meters per minute. The low production costs of peat products of the kind referred to make it economical to use such products to cover large areas, for instance for planting purposes in arid, desert-like regions.

The product in accordance with the invention is economical because it may be produced with the use of a minimum of raw material per unit area.

The invention is not limited to the above embodiments but a variety of modifications are possible within the scope of the appending claims. The additives obviously could differ, both with regard to their nature and their concentrations.

As the highly water-absorbent material could be used starch-based copolymers such as graft-copolymerized acryle-nitrile starch.

Another highly absorbent material which is suitable in this connection are polymer derivatives of cellulose, such as for instance cross-linked forms of sodium carboxy methyl cellulose (CMC) or sodium carboxy methyl fibres (CLD).

These highly absorbent materials should be used in the form of fibrous powders or in granule form.

The peat paper can also be used in its pure form, that is, without additives, to serve as a barrier layer preventing the growth of weeds in such positions of use where black polyethylene foils are used to-day.

The advantages of peat paper over such polyethylene foil are primarily that peat paper, being an organic matter, allows penetration therethrough of rain-water in the autumn it can be worked into the soil, thus serving to improve the quality of the latter. The peat paper could also be used in very steep slopes to preserve the outer, un-protected soil strata from being eroded.

What I claim is:

1. An improved peat paper for use in connection with planting, sowing or weed-control containing peat fibers, cellulose fibers and a bonding agent; the improvement comprising:

said cellulose fibers being a sheet or web supporting said peat fibers, said peat fibers being loose, non-compressed fibers and being joined to said cellulose fibers in a dry-formation process and by means of said bonding agent so as to form paper-like sheets or webs having a weight in the range of 100 to 350 g/cm.

2. An improved peat paper as claimed in claim 1 containing additives, such as hormones, fertilizers, chemicals and similar additives being applied in powder form to said peat fibers before application of said bonding agent.

3. An improved peat paper as claimed in claim 2 containing at least one kind of seed admixed into said peat fibers.

* * * * *